United States Patent Office 3,529,422
Patented Sept. 22, 1970

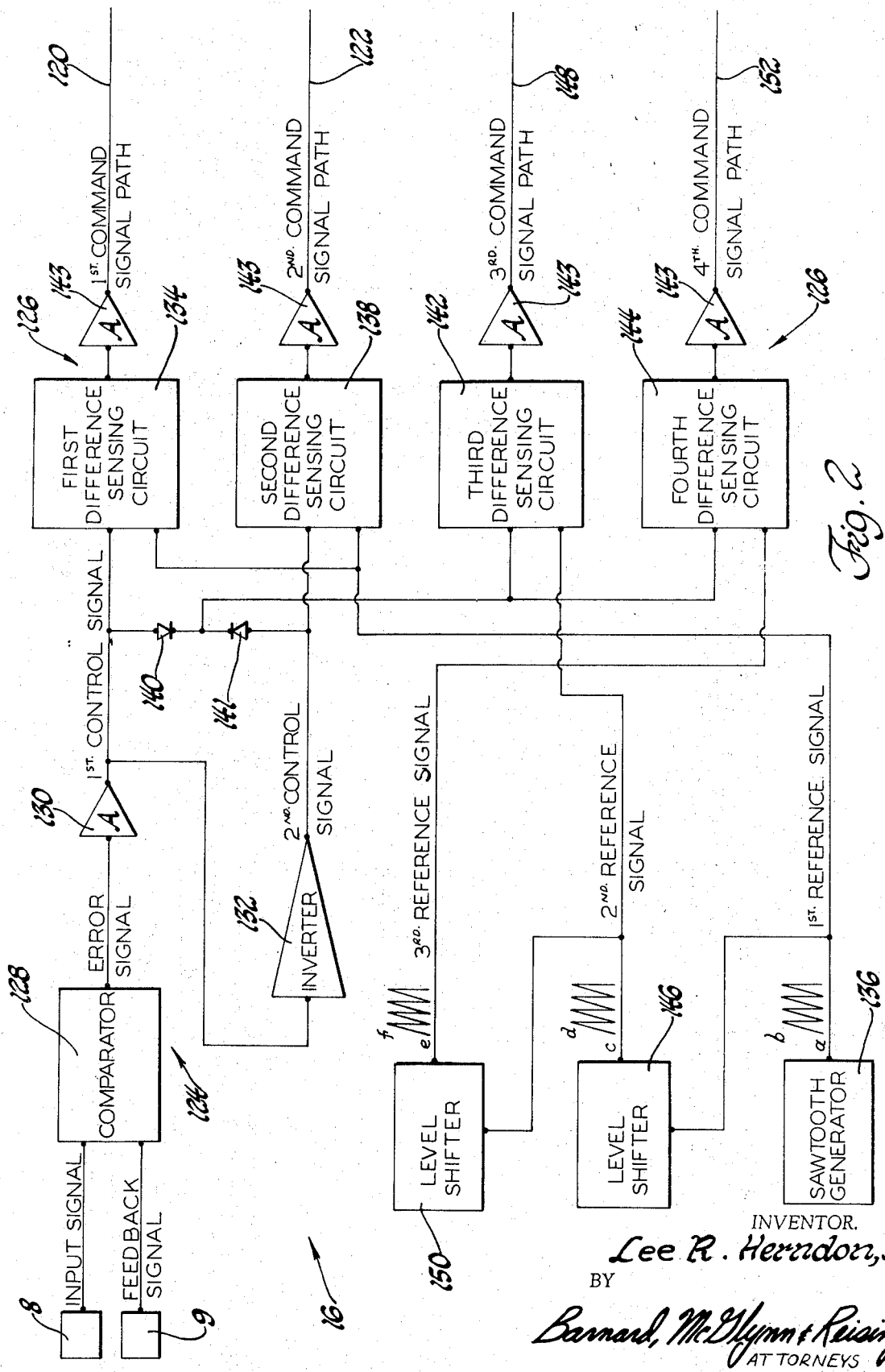

3,529,422
SPEED CONTROL SYSTEM
Lee R. Herndon, Jr., 5640 Woodward,
Birmingham, Mich. 48011
Filed Sept. 23, 1968, Ser. No. 761,591
Int. Cl. F15b *13/16, 15/18;* F04d *15/00*
U.S. Cl. 60—53                    58 Claims

ABSTRACT OF THE DISCLOSURE

A control system for controlling the speed of the output shaft of a hydrostatic transmission having a movable control member for controlling and adjusting the speed of the shaft. An input signal indicative of the desired speed of the shaft is compared with a feedback system indicative of the actual speed of the shaft, and electronic actuating means actuates fluid adjusting means for the control member in response to a difference between the input and feedback signals. The fluid adjusting means includes a plurality of valves for controlling the rate of supply and exhaust of fluid to and from the control member to thus control the rate of adjustment thereof. The actuating means actuates the valves in accordance with the magnitude of the difference between the input and feedback signals to adjust the control member at a relatively fast rate when the difference is large, and at a relatively slow rate when the difference is small. The actuating means includes a sawtooth generator for causing the system to pulsate between fast and slow rates when the magnitude of the difference decreasingly approaches a predetermined value, and to pulsate on and off between the slow rate and zero when the magnitude of the difference approaches zero.

---

Figure 1:
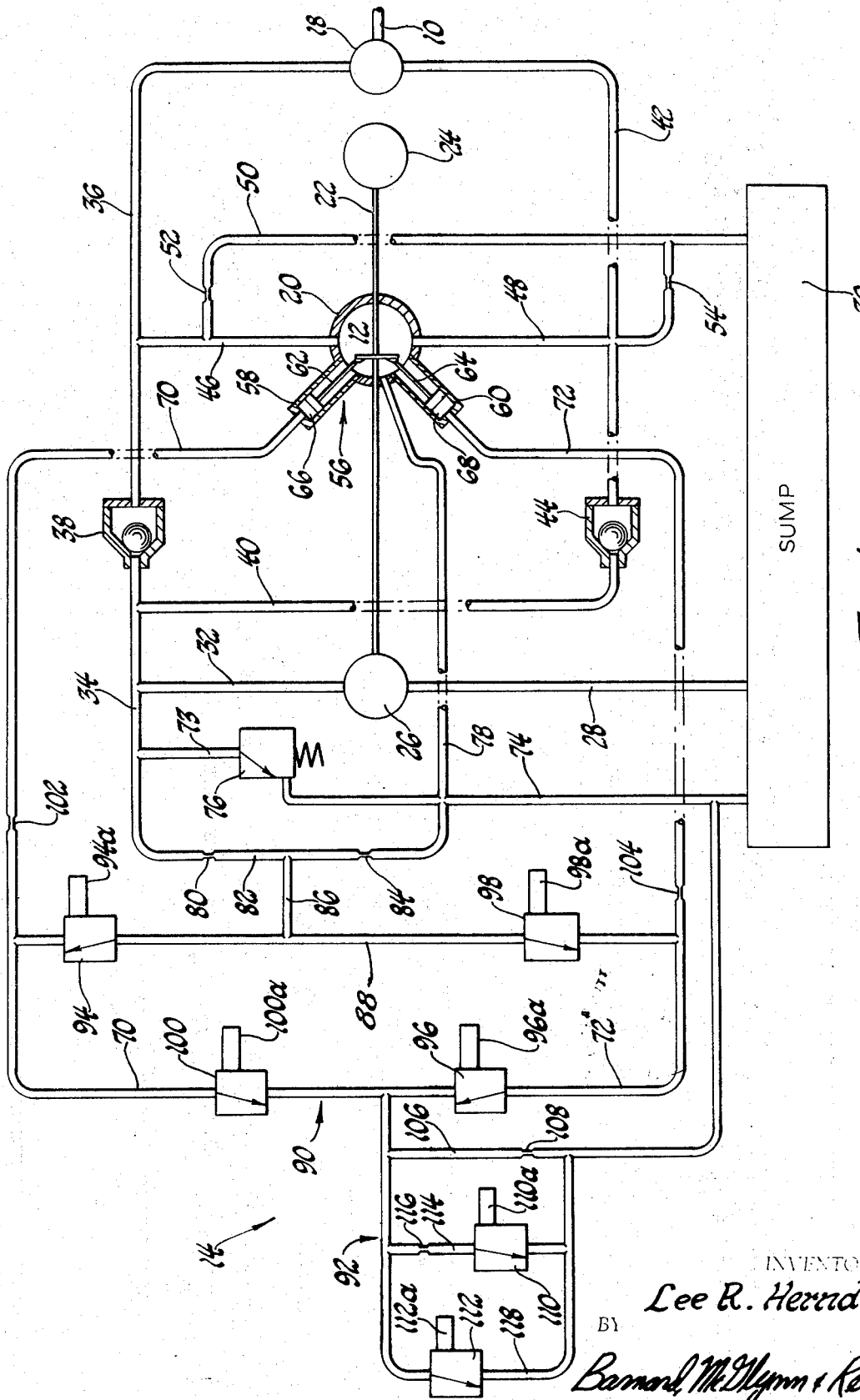

This invention relates generally to speed control systems, and is particularly concerned with a control system for controlling the output speed of a hydrostatic transmission by automatic actuation of fluid adjusting means for a movable shaft speed control member in accordance with the difference between the desired and actual speeds of the output shaft of the transmission.

In hydrostatic transmissions of the type including a variable displacement pump for driving a constant displacement motor, the speed of the output shaft of the motor is adjusted by changing the position of a swash plate or other movable control member that determines the stroke of the variable displacement pump and thus the speed of the output shaft. In such transmissions, the speed of the output shaft of the motor increases with the displacement of the pump. Consequently, when the control member is in a neutral position, the pump displacement is zero and no power is delivered to drive the output shaft. Movement of the control member from the neutral position causes the variable displacement pump to deliver fluid to the motor and drive the output shaft. The displacement of the pump increases as the control member moves from the neutral position. Movement of the control member in opposite directions from its neutral position drives the output shaft in opposite directions.

Therefore, automatic control of the speed of the output shaft can be obtained by automatic adjustment of the position of the control member in accordance with the magnitude of the difference between the desired and actual speeds of the shaft. However, it is difficult to obtain the proper rate of response of the control member when a change in its position is called for due to the fact that if the control member is adjusted at a fast rate regardless of the amount of adjustment needed, the likelihood of overshooting and hunting is increased. Conversely, if the control member is adjusted at a rate slow enough to substantially prevent any overshooting or hunting, excessive time will be required to make large changes when abrupt changes in the shaft speed are needed. Thus, in order to overcome the problem of undue sluggishness, as well as oversensitivity, it is desirable to provide control such that when a large change in the position of the control member is called for, the control member will initially move at a fast rate toward the new position and will move at a very slow rate as it approaches the new position i.e., the position at which the actual and desired speeds of the shaft will be the same. It is difficult, if not impossible, to obtain accurate variable rate control by purely hydraulic means since the necessary fine sensitivity is lacking.

It is therefore the principal object of this invention to provide a control system for the control member that rapidly adjusts the system in response to a command speed change while substantially eliminating hunting.

Another object of this invention is to provide a control system for controlling the speed of a shaft by changing the position of a movable control member having fluid adjusting means for controlling and adjusting the position of the control member, and electronic actuating means responsive to a difference between the desired and actual speed of the shaft for actuating the fluid adjusting means to adjust the position of the control member at a relatively fast rate when the difference is large and at a relatively slow rate when the difference is small.

Another object is to provide a control system for controlling the speed of a shaft by adjusting the position of a movable control member in response to a difference between the desired and actual speeds of the shaft in which the control member is adjusted at a rate that is relatively fast when the difference is large, and is relatively slow when the difference is small.

Still another object is to provide a control system for controlling the speed of a shaft by adjusting the position of a movable control member in response to a difference between the desired and actual speeds of the shaft in which the control member is adjusted at a fine rate when the magnitude of the difference is below a first value; at a medium rate faster than the fine rate when the magnitude of the difference is greater than said first value and less than a second, higher value; and at a coarse rate faster than the medium rate when the magnitude of the difference is greater than said second value.

Another object lies in the provision of a control system for controlling the speed of a shaft by adjusting the position of a movable control member in response to a difference between the desired and actual speeds of the shaft in which the control member is adjusted at a fine rate when the magnitude of the difference is below a first value; at a medium rate faster than the fine rate when the magnitude of the difference is greater than said first value and less than a second, higher value; and at a coarse rate faster than the medium rate when the magnitude of the difference is greater than said second value; and in which the rate pulsates between coarse and medium as the magnitude of the difference decreasingly approaches said second value, between medium and fine as the magnitude of the difference decreasingly approaches said first value, and between fine and zero when the magnitude of the difference approaches zero.

A still further object is to provide a control system for controlling the speed of a shaft by adjusting the position of a movable control member in response to a difference between the desired and actual speeds of the shaft in which the position of the control member is changed by fluid adjusting means, and the fluid adjusting means is electronically actuated to adjust the control member at fine, medium and coarse rates in accordance with whether the difference is below a first value, above the first value, and above a second value higher than the first value, respectively.

Yet another object is to provide a control system for controlling the speed of a shaft by adjusting the position of a movable control member in response to a difference between the desired and actual speeds of the shaft in which fluid adjusting means changes the position of the control member by supply and exhaust of fluid to and from the control member and at a rate determined by the rate of exhaust of fluid from the control member, the fluid adjusting means comprising a plurality of exhaust valves sequentially actuated electronically to provide fine, medium and coarse rates of exhaust according to whether the difference is below a first value, above the first value, and above a second value higher than the first value, respectively.

In carrying out the foregoing, and other objects, a control system according to the present invention includes fluid adjusting means for controlling and adjusting the position of a control member of an output shaft, and actuating means responsive to a difference between the desired and actual speeds of the shaft for actuating the fluid adjusting means to change the position of the control member at a relatively fast rate when the difference is large, and at a relatively slow rate when the difference is small. The fluid adjusting means preferably includes primary adjusting means having at least one active position to initiate adjustment of the control member at a slow, or fine rate, and an inactive position to hold the control member in a stationary position. The adjusting means further includes secondary adjusting means having one active position for increasing the rate of adjustment to a medium rate when the difference between the desired and actual speeds is between a first value and a second higher value, and a second active position for increasing the rate of adjustment to a coarse rate when the magnitude of the difference between the desired and actual speeds is greater than the second value. The primary adjustment means has a first active position to initiate adjustment of the control member in one direction, and a second active position to initiate adjustment of the control member in the opposite direction.

The primary adjusting means includes first and second normally closed supply and exhaust valve means for controlling supply and exhaust of fluid to the control member in opposite directions to initiate adjustment of the control member at a fine rate. The secondary adjustment means includes third and fourth normally closed exhaust valves sequentially movable to their open positions to respectively increase the rate of exhaust from the control member to medium and coarse rates.

The actuating means comprises control signal means for producing first and second control signals of equal magnitude proportional to the magnitude of the difference between the desired and actual speeds of the shaft, the control signals being of opposite sign, and selector means for transmitting a command signal over a first path to one of the primary supply and exhaust valves when the first control signal is of one sign and greater than a reference value, and for transmitting a command signal over a second path to the second primary supply and exhaust valve to actuate the supply and exhaust valve to its open position when the second control signal is of said one sign and greater than a reference value. The selector means further transmits a command signal over a third path to the third valve of the secondary adjusting means when the magnitude of the control signals is greater than a second reference value higher than the first-mentioned reference value, and over a fourth command signal path to the fourth exhaust valve of the secondary adjusting means when the magnitude of the control signals is above a third reference value higher than the second reference value. The reference values are determined by sawtooth reference signals variable between minimum and maximum values such that when the magnitude of the control signals is within the respective ranges of the sawtooth signals, the command signals respectively pulsate on and off to cause their respective valves to pulsate between open and closed positions. Thus, when the magnitude of the control signals is in the range of the third reference signal, the fourth command signal will pulsate on and off to cause the fourth exhaust valve of the secondary adjusting means to pulsate between open and closed positions such that the control member is adjusted at a pulsating rate between the coarse and medium rates. When the magnitude of the control signals is within the range of the second sawtooth reference value, the command signal over the third path to the third normally closed exhaust valve in the secondary adjusting means pulsates on and off and the adjustment rate pulsates between the medium and fine rate. Finally, when the magnitude of the control signals is within the range of the first sawtooth reference signal, the active primary supply and exhaust valve pulsates between open and closed positions to cause the control member to stop and go as it approaches the desired, or null position.

Other objects, advantages and features of the invention will become apparent from the following description taken in connection with the accompanying drawings in which:

FIG. 1 is a schematic diagram of a hydrostatic transmission having fluid adjusting means for changing the position of a control member to vary the speed of the output shaft thereof; and FIG. 2 is a diagram of electronic actuating means for actuating the adjusting means of FIG. 1.

The drawing illustrates a control system for controlling the speed of a shaft 10 comprising a movable control member 12 controlling the speed of the shaft 10, means 8 (FIG. 2) providing an input signal indicative of the desired speed of the shaft; means 9 (FIG. 2) responsive to the speed of the shaft for developing a feedback signal indicative of the actual speed of the shaft; fluid adjusting means indicated generally at 14 for controlling and adjusting the position of the control member 12; and actuating means indicated collectively at 16 (FIG. 2) responsive to a difference between the input and feedbck signals for actuating the fluid adjusting means 14 (FIG. 1) to adjust the position of the control member 12 at a relatively fast rate when the difference is large, and at a relatively slow rate when the difference is small.

Shaft 10 constitutes the output shaft of a hydrostatic transmission including a constant displacement fluid or hydraulic motor 18 driven by a variable displacement pump 20. The displacement of pump 20 as well as the direction of delivery of pump 20 is determined by the position of the control member 12 which may comprise a conventional swash plate or the like. Pump 20 is driven by the input shaft 22 of an electric motor 24 or other prime mover. The input shaft 22 from motor 24 also drives a charging pump 26 that continuously withdraws hydraulic fluid from a reservoir or sump 30 through an intake line 28 and delivers hydraulic fluid through an output line 32 into the hydraulic system.

One side of the fluid motor 18 in connected with the output line 32 through fluid lines 34 and 36. A check valve 38 between lines 34 and 36 permits one-way flow only from line 34 to line 36. The other side of the fluid motor 18 is connected to receive fluid from the output line 32 through a line 40 and a line 42. Line 40 communicates with line 34, and backflow from line 42 to line 40 is prevented by a check valve 44.

When the swash plate or control member 12 of the variable displacement pump 20 is in a neutral position, pump 20 does not pump any fluid since the pump pistons, or other delivery means, are not actuated by the control member 12 in a neutral position. Movement of the control member 12 in one direction from its neutral position causes pump 20 to deliver fluid through a line 46 to line 36 to drive the output shaft 10 in one direction. In this case, line 42 serves as a return line from the fluid motor 18. Conversely, adjustment of control member 12 in the opposite direction from its neutral position causes the pump 20 to deliver fluid to the other side of motor 18 through a line 48 to line 42 in which case line 36 serves as a return line from the fluid motor 18. Line 46 is connected with sump through a drain line 50 having a restriction 52, and line 48 is connected with the drain line 50 through a restriction 54.

As pointed out previously, the speed of output shaft 10 is determined by the position of the movable control member 12, and the position of control member 12 is adjusted by a control system including fluid operating means 56 having first and second expansible and contractible chambers 66 and 68, respectively, in opposed fluid relationship such that admission of fluid to one of chambers 66 and 68 causes said one chamber to expand at a rate determined by the rate of exhaustion of a corresponding amount of fluid from the other of chambers 66 and 68, said operating means 56 being connected with the movable control member 12 such that admission of fluid to the first chamber 66 moves the control member 12 in one direction in accordance with the rate of expansion of said first chamber 66 and admission of fluid to the second chamber 68 moves the control member 12 in the opposite direction in accordance with the rate of expansion of said second chamber 68; a source of fluid pressure 26; and fluid adjusting means 14 controlling supply and exhaust of fluid to and from said operating means 56 to control the position of the control member 12, said adjusting means 14 being operable to connect one of said chambers 66 and 68 with the source of fluid 26 to admit fluid to said one chamber, and operable to connect the other of said chambers 66 and 68 with exhaust and provide a selectively variable rate of flow from said other chamber.

More specifically, the fluid operating means 56 includes a pair of cylinders 58 and 60 having pistons 62 and 64, respectively, for defining with said cylinders the expansible and contractible chambers 66 and 68. Fluid is supplied to and exhausted from chamber 66 through a fluid line or conduit 70, and fluid is supplied to and exhausted from chamber 68 through a fluid line 72. As set forth above, the rate of movement of control member 12 is determined by the rate of exhaustion of fluid from one of the chambers 66 and 68 through lines 70 and 72, respectively. The rate of exhaustion of fluid from lines 70 or 72 is controlled by the adjusting means designated generally by reference numeral 14 in FIG. 1 in a manner to be set forth more specifically herein below. Moreover, the adjusting means 14, when inactive, traps fluid in lines 70 and 72 to maintain the control member 12 in a stationary position.

Line 34 communicates with a line 73, which in turn communicates with a drain line 74 through a relief valve 76. When the pressure in lines 34 and 73 is sufficient to overcome the bias of the relief valve spring, relief valve 76 connects line 73 with drain line 74 to relieve the pressure in the system. Drain line 74 also communicates with a drain line 78 from pump 20. Line 34 also communicates with a line 82 through a restriction 80, and line 82 in turn communicates with the drain line 74 through a restriction 84, and with a supply line 88 through a connecting line 86. The charging pump 26 continuously delivers fluid into the supply line 88 through line 34, and the pressure is maintained in line 88 by restrictions 80 and 84.

When line 70 is placed in communication with the supply line 88, the pressure in line 70 increases, and the additional pressure tends to expand chamber 66. However, since chamber 66 is in opposed fluid relationship with chamber 68, that is, since control member 12 cannot move to permit expansion of chamber 66 without corresponding contraction of chamber 68, chamber 66 can expand only if fluid is drained from line 72 at the same rate at which fluid is added to line 70. Conversely, if line 72 is placed in communication with the supply line 88, the pressure in line 72 will increase tending to expand chamber 68, which expansion must, however, be accompanied by an equal amount of contraction of chamber 66. Thus, the rate of change of the position of control member 12 is determined by the rate at which fluid is supplied to and exhausted from the fluid operating means 56 by the adjusting means 14.

The fluid adjusting means 14 includes primary adjusting means designated generally by reference number 90, and secondary adjustment means designated generally by reference numeral 92. The primary adjusting means includes first supply and exhaust valve means comprising a first, normally closed, primary supply valve 94 controlling communication between supply line 88 and line 70, and a first, normally closed, primary exhaust valve 96 controlling communication between line 72 and a primary exhaust line 106 which in turn communicates through a restriction 108 with drain line 74. The primary adjusting means further comprises second supply and exhaust valve means comprising a second normally closed primary supply valve 98 controlling communication between supply line 88 and line 72, and a second normally closed, primary exhaust valve 100 controlling communication between line 70 and the primary exhaust line 106. When supply valve 94 is actuated to its open position, line 70 is placed in communication with supply line 88 to admit additional fluid to line 70. A restriction 102 is provided in line 70 to smooth out the response of the fluid operating means 56 to pressure changes. A similar restriction 104 is provided in line 72. Valves 94, 96, 98 and 100 are electrically operated to their open positions by solenoids 94a, 96a, 98a and 100a respectively.

As pointed out previously, the expansion of one of chambers 66 and 68 must be accompanied by corresponding contraction of the other of chambers 66 and 68. Thus, if line 70 is placed in communication with supply line 88, line 72 must be placed in communication with exhaust line 106 in order to permit the chamber 66 to expand and move the control member 12 to a new position. Conversely, if line 72 is placed in communication with supply line 88, line 70 must be placed in communication with exhaust in order for chamber 68 to expand and adjust control member 12 in the opposite direction. When valves 96 or 100 are alternately actuated to their open positions, lines 70 and 72 are respectively placed in communication with the primary exhaust line 106 which permits fluid to drain from the respective lines 70 or 72 at a relatively slow, or fine rate.

The secondary adjusting means 92 is operable to increase the rate of exhaust from lines 70 or 72 to thus increase the rate of adjustment of control member 12. The secondary adjusting means 92 includes a third normally closed, secondary exhaust valve 110 operated by a solenoid 110a and which controls a second exhaust line or passage 114 having a restriction 116 on the inlet side of valve 110. The second exhaust passage 114 communicates with the primary exhaust passage 106 on the outlet sides of the primary exhaust valves 96 and 100. The secondary adjusting means 92 further includes a fourth normally closed, secondary exhaust valve 112 operated by a solenoid 112a, and which controls a third exhaust passage 118. The third exhaust passage 118 also communicates with the primary exhaust passage 106 on the outlet side of the primary exhaust valves 96 and 100.

The primary adjusting means 90 thus has a first active position to initiate adjustment of control member 12 at a fine rate in one direction in which the first supply valve 94 and first exhaust valve 96 are actuated to their open positions with the second supply valve 98 and second exhaust valve 100 remaining in their closed positions; a second active position to initiate adjustment of the control member at a fine rate in the opposite direction in which the second supply valve 98 and the second exhaust valve 100 are actuated to their open positions with valves 94 and 96 remaining in their closed positions; and an inactive position to hold the control member 12 stationary which is the position shown in FIG. 1 in which valves 94, 96, 98 and 100 are all in their closed positions to trap fluid in lines 70 and 72 and thus hydraulically lock control member 12 in a fixed position. The secondary adjusting means 92 has a first active position for increasing the rate of adjustment of the control member to a medium rate when the primary adjusting means 90 is in one of its active positions in which valve 110 is in its open position and valve 112 remains in its closed position, and a second active position for increasing the rate of adjustment of the control member to a coarse rate when the primary adjusting means is in one of its active positions in which both valves 110 and 112 are in their open positions to permit fluid to drain from one of lines 70 and 72 at a maximum rate through lines 106, 114 and 118.

To summarize the system thus far, the speed of output shaft 10 is determined by the position of the movable control member 12, and control member 12 is in turn controlled by a control system comprising fluid operating means 56 having first and second expansible and contractible chambers 66 and 68 in opposed fluid relationship such that admission of fluid to one of the chambers 66 and 68 causes said one chamber to expand at a rate determined by the rate of exhaustion of a corresponding amount of fluid from the other of said chambers 66 and 68. The operating means 56 is connected with the movable control member 12 such that admission of fluid to the first chamber 66 moves the control member in one direction in accordance with the rate of expansion of chamber 66, and admission of fluid to the second chamber 68 moves the control member 12 in the opposite direction in accordance with the rate of expansion of the second chamber 68. The system includes a source of fluid pressure 26, 30 and fluid adjusting means 14 controlling supply and exhaust of fluid to and from the operating means 56 to control the position of the control member 12. The adjusting means 14 is operable to connect one of chambers 66 and 68 with the source of fluid pressure to admit fluid to one of the chambers 66 and 68, and is operable to connect the other of the chambers 66 and 68 with exhaust and provide a selectively variable rate of flow therefrom. The adjusting means includes primary exhaust passage means 106 and secondary exhaust passage means 114 and 118. Primary exhaust valve means 96 and 100 is operable to connect the operating means 56 with exhaust through the primary exhaust passage means 106 to adjust the control member at a fine rate, and secondary exhaust valve means 110, 112 is operable to additionally connect the operating means 56 with exhaust through the secondary exhaust passage means 114, 118 to adjust the control member 12 at a faster rate.

The actuating means 16 illustrated diagrammatically in FIG. 2 determines the sequence of operation of valves 94, 96, 98, 100, 110 and 112 in accordance with the magnitude of the difference between an input signal indicative of the desired speed of shaft 10 and a feedback signal indicative of the actual speed of shaft 10. As pointed out above, an input signal is provided by a means 8 which is indicative of the desired speed of the shaft. The input signal may be provided by a means 8 comprising a cam-controlled potentiometer, a magnetic tape or the like. As also pointed out previously, a feedback signal indicative of the actual speed of the shaft is developed by a means 9 which may comprise a tachometer responsive to the speed of the shaft.

Again, referring to FIG. 2, the control system of the present invention comprises first and second command signal paths 120 and 122, respectively, control member 12 being movable in response to a command signal over the first path 120 to adjust the speed of the shaft in one direction and movable in response to a command signal over the second path 122 to adjust the speed of the shaft in the opposite direction, means 8 providing an input signal indicative of the desired speed of the shaft 10; means 9 responsive to the speed of the shaft for developing a feedback signal indicative of the actual speed of the shaft 10; control signal means 124 responsive to a difference between the input and feedback signals for providing first and second control signals of equal magnitude and opposite signs, the magnitude of the control signals being proportional to the difference between the input and feedback signals; and selector means 126 for transmitting a command signal over the first path 120 when the first control signal is of one sign and has a magnitude greater than a first reference value, and for transmitting a command signal over the second path when the second control signal is of said one sign and has a magnitude greater than the first reference value.

The first comman signal path 120 is electrically connected with solenoids 94a and 96a, and the second command signal path 122 is electrically connected with solenoids 98a and 100a. Thus, when a command signal is transmitted over path 120, the first supply and exhaust valve means 94, 96 is actuated to admit fluid to chamber 66 from supply line 88 and exhaust fluid from chamber 68 through the primary exhaust passage 106 at a fine rate.

The control signal means 124 includes a comparator 128 responsive to a difference between the input and feedback signals for developing an error signal proportional to the magnitude of the difference between the input and feedback signals. The control signal means may further include an amplifier 130 for providing a first control signal proportional to the error signal, and an inverter 132 for providing a second control signal of the same magnitude as the first control signal but of opposite sign. Of course, as is readily apparent, the error signal could be applied to a pair of equal gain amplifiers with one being an inverting amplifier.

The selector means 126 includes a first difference sensing circuit 134 for receiving the first control signal as well as a first reference signal from a ramp or sawtooth generator 136. A second difference sensing circuit 138 receives the second control signal and the first reference signal from the sawtooth generator 136. The difference sensing circuits 134 and 138 may, for example, comprise positive difference sensing circuits operable to sense the positive difference between their respective control signals and the first reference signal and transmit a command signal over their respective command signal paths when their respective control signals have a positive difference over the reference signal. For example, if the first control signal is negative, the second control signal will be positive, and hence, a command signal will be transmitted by the second difference sensing circuit 138 over the second command signal path 122 if the magnitude of the second control signal is greater than the first reference signal from the saw-tooth generator 136, and no command signal will be transmitted over the first path 120. Conversely, if the first control signal is positive, the first difference sensing circuit 134 will transmit a command signal over path 120 if the magnitude of the control signals is greater than that of the reference signal, and no command signal will be transmitted over path 122. The command signals from each of the difference sensing circuits may be amplified by conventional amplifiers 143, if desired.

The sawtooth generator 136 provides a first reference signal that varies in a range between a minimum and maximum value. Specifically, the signal from the sawtooth generator 136 continuously increases in magnitude from a minimum value indicated at $a$ to a maximum or peak value indicated at $b$ and then returns to $a$. Consequently, when the magnitude of the control signals is within the range of the variable reference signal between values $a$ and $b$, the command signal pulsates "on" and "off" until the magnitude of the control signals decreases to the minimum value of the reference signal.

Thus, assuming that the difference sensing circuits sense positive differences between the control and reference signals, and that a difference develops between the input and feedback signals to produce a positive first control signal to the first difference sensing circuit 134 having a magnitude greater than the maximum value of the reference signal, a steady command signal will be transmitted over path 120 to solenoid 94a and 96a resulting in the admission of fluid to chamber 66 and the exhaust of fluid from chamber 68 of the operating means 56. As the control member 12 is moved toward a new position at the fine rate of adjustment, the speed of shaft 10 will be correspondingly adjusted to change the feedback signal toward the magnitude of the input signal. The magnitude of the control signals will thus correspondingly decrease until it falls within the range of the sawtooth reference signal between the levels indicated at $a$ and $b$. While the control signal is within the range of the reference signal, the command signal will pulsate on and off and valves 94 and 96 will pulsate between their open and closed position as control member 12 approaches the desired position until the difference between the input and feedback signals becomes zero. Thus, while the system is operable utilizing a constant rather than a sawtooth reference signal, the sawtooth reference permits exceedingly fine control of the movement of the swash plate.

The selector means 126 further includes cathode coupled diodes 140 and 141 connected in series between the control signal paths which permits only the positive signal to pass to third and fourth difference sensing circuit 142 and 144, respectively. The third difference sensing circuit receives a second reference signal from a level shifter 146. The level shifter 146 receives the sawtooth signal from the generator 136 and augments it to increase the minimum value to a value greater than the maximum value of the first reference signal. The second reference signal developed by level shifter 146 continuously increases in magnitude from a minimum value indicated at $c$ to a peak or maximum value $d$ and returns to $c$. Furthermore, the minimum value $c$ is preferably greater than the maximum value $b$ of the first reference signal. Thus, the third difference sensing circuit senses the difference between the magnitude of the control signals and the magnitude of the second reference signal and transmits a command signal over a third command signal path 148 to solenoid 110a when said control signal is greater than said reference signal. Moreover, when the magnitude of the control signals is within the minimum and maximum range of the second reference signal, i.e., when the magnitude of the control signals is between the reference values $c$ and $d$, the command signal over the third path 148 pulsates on and off to cause valve 110 to pulsate between its open and closed positions.

The fourth difference sensing circuit 144 receives the control signal and a third reference signal from a level shifter 150 operable to augment the second reference signal to provide a third reference signal having a minimum value greater than the maximum value of the second reference signal. The third reference signal developed by level shifter 150 continuously increases in magnitude from a minimum value indicated at $e$ to a maximum value indicated at $f$ and returns to $e$. The minimum value $e$ is preferably greater than the maximum value $d$ of the second reference signal. Therefore, the fourth difference sensing circuit transmits a command signal over a fourth path 152 to solenoid 112a when the magnitude of the control signals is greater than the magnitude of the third reference signal. Furthermore, when the magnitude of the control signals is within the range of the third reference signal, the command signal over the fourth path pulsates on and off to cause valve 112 to pulsate between its open and closed position. Again, it is apparent that the reference signals for the third and fourth sensing circuit could be of a constant magnitude, but the degree of control would correspondingly deteriorate. Further, while as shown in FIG. 2, the level shifting is shown to operate on the reference signal, it could, as is readily apparent, operate on the control signal developed at the junction of diodes 140 and 141.

To summarize the operation of the system, let it be assumed that when the input signal is less than the feedback signal, the error signal and first control signal will be negative; and when the input signal is greater than the feedback signal, the error signal and first control signal will be positive. Let it further be assumed that the difference sensing circuits 134 and 138 transmit command signals only when a positive control signal is received and only when a positive difference exists between their respective control signals and the first reference signal. Thus, the direction of adjustment of the control member 12 is determined by the first and second difference sensing circuits 134 and 138. Now assume that a large, abrupt change in the input signal occurs, in a direction to produce a positive error signal and first control signal, and assume that the magnitude of the control signals is greater than the maximum magnitude of the third reference signal. The first difference sensing circuit 134 will transmit a command signal to actuate supply valve 94 and exhaust valve 96 to their open positions to initiate adjustment of control member 12. Simultaneously, command signals will be transmitted over the third and fourth paths to solenoids 110a and 112a to actuate valves 110 and 112 of the secondary adjusting means to their open positions. As a result, chamber 66 will expand and chamber 68 will contract to adjust control member 12 at the coarse rate since maximum flow is provided from line 72 through lines 106, 114 and 118. As the shaft speed is correspondingly adjusted by the rapid movement of the control member 12, the difference will decrease between the input and feedback signals to thus reduce the magnitude of the control signal. When the magnitude of the control signal falls within the range of the variable third reference signal, the command signal over the fourth path to solenoid 112a will pulsate on and off and valve 112 will pulsate between its opened and closed positions. The adjusting means 14 will be in a condition that the rate of adjustment will pulsate between the coarse and medium rates. When the magnitude of the control signals falls below the minimum value of the third sawtooth reference signal, the command signal over the fourth path 152 will cease and valve 112 will remain in its closed position. Similarly, as the magnitude of the control signals falls within the range of the second sawtooth reference signal, the medium valve 110 will pulsate between its open and closed positions and the rate of adjustment will pulsate between the medium and fine rates until the magnitude of the control signals falls below the minimum value of the second sawtooth reference signal. As the speed of the shaft approaches the desired speed, the magnitude of the control signals will fall within the range of the first sawtooth reference signal causing the command signal over path 120 to pulsate on and off and in turn cause valves 94 and 96 to pulsate between their open and closed positions. Thus, the rate of adjustment will pulsate between the fine and off condition, until shaft 10 reaches the desired speed to erase the error signal and hence the control signals.

While a specific form of the invention has been illustrated and described in the foregoing specification and accompanying drawings, it will be understood by those skilled in the art that the invention is not limited to the exact arrangement shown, but that various alternatives, all falling within the scope and spirit of the invention, will be apparent to those skilled in the art.

The embodiments of the invention in which an exclusive property or privilege is claimed are defined as follows:

1. A control system for controlling the speed of a shaft comprising: a movable control member controlling the speed of the shaft; means providing an input signal indicative of the desired speed of the shaft; means responsive to the speed of the shaft for developing a feedback signal indicative of the actual speed of the shaft; fluid adjusting means for controlling and adjusting the position of the control member; and actuating means responsive to a difference between the input and feedback signals for actuating the fluid adjusting means to adjust the position of the control member at a relatively fast rate when the difference is large, and at a relatively slow rate when the difference is small.

2. A control system as claimed in claim 1 wherein said fluid adjusting means includes primary adjusting means having at least one active position to initiate adjustment of the control member at a slow rate, and an inactive position to hold the control member stationary.

3. A control system as claimed in claim 2 wherein said fluid adjusting means further includes secondary adjusting means having at least one active position for increasing the rate of adjustment of the control member when the primary adjusting means is active, and an inactive position in which it has no effect on the control member.

4. A control system as claimed in claim 3 wherein said secondary adjusting means has a first active position for increasing the rate of adjustment to a medium rate when the magnitude of the difference between the input and feedback signals is between a first value and a second higher value, and a second active position for increasing the rate of adjustment to a coarse rate when the magnitude of the difference between the input and feedback signals is greater than said second value.

5. A control system as claimed in claim 4 wherein said primary adjusting means has a first active position to initiate adjustment of the control member in one direction, and a second active position to initiate adjustment of the control member in the opposite direction.

6. A control system as claimed in claim 1 wherein said adjusting means includes primary adjusting means having a first active position for adjusting the control member at a fine rate in one direction, a second active position for adjusting the control member at a fine rate in the opposite direction, and an inactive position to hold the control member stationary.

7. A control system as claimed in claim 6 wherein said control member is movable in opposite directions in response to supply and exhaust of fluid in opposite directions, and wherein said primary adjusting means includes first normally closed valve means movable to an open position in the first active position of said primary adjusting means to initiate supply and exhaust of fluid to the control member in one direction; and second normally closed valve means movable to an open position in the second active position of the primary adjusting means to cause supply and exhaust of fluid in the opposite direction.

8. A control system as claimed in claim 6 wherein said adjusting means further includes secondary adjusting means having a first active position for increasing the rate of adjustment of the control member to a medium rate when the primary adjusting means is in one of its active positions, a second active position for increasing the rate of adjustment of the control member to a coarse rate when the primary adjusting means is in one of its active positions, and an inactive position in which it has no effect on the adjustment of the control member.

9. A control system as claimed in claim 8 wherein said control member is movable in opposite directions in response to supply and exhaust of fluid in opposite directions, and wherein said primary adjusting means includes first normally closed valve means movable to an open position in the first active position of the primary adjusting means to initiate supply and exhaust of fluid to the control member in one direction; and second normally closed valve means movable to an open position in the second active position of the primary adjusting means to initiate supply and exhaust of fluid to the control member in the opposite direction.

10. A control system as claimed in claim 9 wherein said secondary adjusting means includes third normally closed valve means movable to an open position in the active positions of said secondary adjusting means to increase the rate of supply and exhaust of fluid to the control member to a medium rate.

11. A control system as claimed in claim 10 wherein said secondary adjusting means includes fourth normally closed valve means movable to an open position in the second active position of said secondary adjusting means to increase the rate of supply and exhaust of fluid to the control member to a coarse rate.

12. A control system as claimed in claim 11 further including a fluid operating means having first and second expansible and contractible chambers in opposed fluid relationship such that admission of fluid to one of the chambers causes said one chamber to expand at a rate determined by the rate of exhaustion of a corresponding amount of fluid from the other of said chambers, said fluid operating means being connected with the movable control member such that admission of fluid to said first chamber moves the control member in one direction in accordance with the rate of expansion of said first chamber, and admission of fluid to the second chamber moves the control member in the opposite direction in accordance with the rate of expansion of said second chamber.

13. A control system as claimed in claim 12 wherein said primary adjusting means includes primary exhaust passage means controlled by said first and second valve means, and said secondary adjusting means includes secondary exhaust passage means controlled by said third and fourth exhaust valve means, respectively.

14. A control system as claimed in claim 13 wherein said primary exhaust passage means comprises a primary restricted passage permitting exhaust of fluid from said operating means at a fine rate.

15. A control system as claimed in claim 14 wherein said secondary exhaust passage means includes a second exhaust passage in fluid communication with said primary exhaust passage downstream from said first and second exhaust valve means cooperable with said primary passage for permitting fluid to exhaust from said operator at a medium rate; said second exhaust passage being controlled by said third valve means.

16. A control system as claimed in claim 15 wherein said secondary exhaust passage means further includes a third exhaust passage in fluid communication with said primary exhaust passage on the outlet side of said first and second exhaust valve means cooperable with said primary and second passages for permitting fluid to exhaust from said operator at a coarse rate.

17. A control system as claimed in claim 16 further including a restriction in said second exhaust passage on one side of said third exhaust valve means.

18. A control system as claimed in claim 11 wherein said first valve means is connected with a first command signal path from said actuating means and is movable to its open position in response to a command signal over said first path; and said second valve means is connected with a second command signal path from said actuating means and is movable to an open position in response to a command signal over said second path.

19. A control system as claimed in claim 18 wherein said actuating means is operable to transmit a command signal over one of said first and second paths in response to a difference between the input and feedback signals.

20. A control system as claimed in claim 19 wherein said actuating means is operable to transmit a command signal over one of said first and second paths when the input signal is less than the feedback signal, and is operable to transmit a command signal over the other of said first and second paths when the input signal is greater than the feedback signal.

21. A control system as claimed in claim 20 wherein said actuating means is operable to pulsate the command signal over said first or second paths on and off as the difference between the input and feedback signals approaches zero to cause the respective first or second valve means to open and close.

22. A control system as claimed in claim 19 wherein said actuating means includes: means for receiving said input and feedback signals and transmitting first and second control signals proportional to the difference between the input and feedback signals; means for transmitting a reference signal; and selector means for receiving said reference signal and said first and second control signals and transmitting a command signal over said first path when said first control signal is of one sign and of greater magnitude than the reference signal, and transmitting a command signal over said second path when said second control signal is of said one sign and greater than said reference signal.

23. A control system as claimed in claim 22 wherein the magnitude of said reference signal is variable in a range to cause the command signal to pulsate on and off within said range.

24. A control system as claimed in claim 22 wherein said control system transmitting means comprises: a comparator for receiving said input and feedback signals and transmitting an error signal proportional to the difference between the input and feedback signals; and means for receiving said error signal and transmitting said control signals, said control signals being proportional to said error signal.

25. A control system as claimed in claim 22 wherein said selector means comprises: a first difference sensing circuit receiving said first control signal and said reference signal and transmitting a command signal over said first path when said first control signal is of said one sign and of greater magnitude than the reference signal; and a second difference sensing circuit for receiving said second control signal and said reference signal and transmitting a command signal over said second path when said second control signal is of said one sign and of greater magnitude than the reference signal.

26. A control system as claimed in claim 21 wherein said selector means comprises: a first difference sensing circuit receiving said first control signal and said reference signal and transmitting a command signal over said first path when said first control signal is of said one sign and of greater magnitude than the reference signal; and a second difference sensing circuit for receiving said second control signal and said reference signal and transmitting a command signal over said second path when said second control signal is of said one sign and of greater magnitude than the reference signal.

27. A control system as claimed in claim 19 wherein said third valve means is connected with a third command signal path from said actuating means and is movable to an open position in response to a command signal over said third path; and said fourth valve means is connected with a fourth command signal path from said actuating means and is movable to an open position in response to a command signal over said fourth path.

28. A control system as claimed in claim 27 wherein said actuating means includes: means for transmitting a command signal over one of said first and second paths in response to a difference between the input and feedback signals; means for transmitting a command signal over said third path when the magnitude of the difference is between a first value and a second higher value; and means for transmitting a command signal over said fourth path when the magnitude of the difference is greater than said second value.

29. A control system as claimed in claim 28 wherein said actuating means includes: reference means for causing (1) the command signal over said fourth path to pulsate on and off to cause said fourth valve means to open and close as the magnitude of the difference decreasingly approaches said second value, (2) the command signal over said third path to pulsate on and off to cause said third valve means to open and close as the magnitude of the difference decreasingly approaches said first value, and (3) the command signal over said one of said first and second paths to pulsate on and off to cause said one of said first and second valve means to open and close as the difference approaches zero.

30. A control system as claimed in claim 1 wherein said adjusting means has a fine adjusting position for adjusting the control member at a fine rate when the difference between the input and feedback signals is below a first value; a medium adjusting position when the difference between the input and feedback signals is between the first value and a second higher value, and a coarse adjustment position when the difference between the input and feedback signals is greater than the second value.

31. A control system for controlling the speed of a shaft comprising: a movable control member controlling the speed of the shaft; means providing an input signal indicative of the desired speed of the shaft; means responsive to the speed of the shaft for developing a feedback signal indicative of the actual speed of the shaft; adjusting means for controlling and adjusting the position of the control member; and actuating means responsive to a difference between the input and feedback signals for actuating the adjusting means to adjust the position of the control member at a relatively fast rate when the difference is large, and at a relatively slow rate when the difference is small.

32. In a control system for controlling the speed of an output shaft in which the speed of the shaft is determined by the position of a movable control member: fluid operating means having first and second expansible and contractible chambers in opposed fluid relationship such that admission of fluid to one of the chambers causes said one chamber to expand at a rate determined by the rate of exhaustion of a corresponding amount of fluid from the other of said chambers, said operating means being connected with the movable control member such that admission of fluid to said first chamber moves the control member in one direction in accordance with the rate of expansion of said first chamber, and admission of fluid to the second chamber moves the control member in the opposite direction in accordance with the rate of expansion of said second chamber; a source of fluid pressure; and fluid adjusting means controlling supply and exhaust of fluid to and from said operating means to control the position of the control member, said adjusting means being operable to connect one of said chambers with said source of fluid to admit fluid to said one chamber, and operable to connect the other of said chambers with exhaust and provide a selectively variable rate of flow from said other chamber.

33. The combination claimed in claim 32 wherein said adjusting means includes: primary and secondary exhaust passage means; primary exhaust valve means operable to connect said operating means with exhaust through said primary exhaust passage means to adjust the control member at a fine rate; and secondary exhaust valve means operable to additionally connect said operating means with exhaust through said secondary exhaust passage means to adjust the control member at a faster rate.

34. The combination claimed in claim 33 wherein said primary exhaust passage means comprises a first exhaust passage; and said primary exhaust valve means comprises a first exhaust valve operable to permit exhaust of fluid from said operating means in one direction through said first exhaust passage at a fine rate and a second exhaust valve operable to permit exhaust of fluid from said operating means in the opposite direction through said first exhaust passage at a fine rate.

35. The combination claimed in claim 34 wherein said secondary exhaust passage means comprises second and third exhaust passages each in fluid communication with said first exhaust passage on the outlet side of the first and second exhaust valves; and said secondary exhaust valve means comprises a third exhaust valve operable to additionally permit exhaust of fluid from said operating means through said second exhaust passage when one of said first and second exhaust valves is open to increase the rate of exhaust of fluid from the operating means to a medium rate, and a fourth exhaust valve operable to additionally permit exhaust of fluid from said operating means through said third exhaust passage when said one of said first and second exhaust valves and said third exhaust valve is open to increase the rate of exhaust of fluid from the operating means to a coarse rate.

36. A control system for controlling the speed of an output shaft in which the speed of the shaft is determined by the position of a movable control member, said control system comprising: control member position adjusting means having a closed condition to maintain the control member stationary, and fine, medium and coarse adjustment conditions to respectively adjust the position of the control member at a relatively slow, fine rate, a medium rate, and a relatively fast, coarse rate; means providing a variable input signal indicative of the desired speed of the output shaft; means responsive to the speed of the output shaft for developing a feedback signal indicative of the actual speed of the shaft; means for receiving said input and feedback signals and transmitting a command signal in response to a difference between said input and feedback signals to actuate said position adjusting means to the fine adjustment condition when the magnitude of the difference is below a first value, to the medium adjustment condition when the magnitude of the difference is between said first value and a second higher value, and to the coarse adjustment condition when the magnitude of the difference is greater than said second value.

37. A control system as claimed in claim 36 further including means for modifying the command signal as the magnitude of said difference decreases in response to adjustment of the control member to cause said adjusting means to pulsate between the coarse and medium condition as the magnitude of said difference approaches said second value, pulsate between the medium and fine condition as the magnitude of said difference approaches said first value, and pulsate between the fine and closed conditions as the magnitude of the command signal approaches zero.

38. A control system as claimed in claim 37 further including: fluid operating means having first and second expansible and contractible chambers in opposed fluid relationship such that admission of fluid to one of the chambers causes said one chamber to expand at a rate determined by the rate of exhaustion of fluid from the other of said chambers, said operating means being connected with the control member such that admission of fluid to said first chamber moves the control member in one direction in accordance with the rate of expansion of said first chamber and admission of fluid to said second chamber moves the control member in the opposite direction in accordance with the rate of expansion of said second chamber; said position adjusting means being operable to control admission and exhaust of fluid to and from said first and second chambers.

39. A control system as claimed in claim 38 wherein said position adjusting means includes: normally closed first supply and exhaust valve means for controlling admission of fluid to said first chamber and exhaust of fluid from said second chamber, and normally closed second supply and exhaust valve means for controlling admission of fluid to said second chamber and exhaust of fluid from said first chamber.

40. A control system as claimed in claim 39 wherein said command signal transmitting means is operable to transmit a command signal to one of said first and second valve means when the input signal is greater than the feedback signal to actuate said one valve means to the open condition, and is operable to transmit a command signal to the other of said first and second valve means when the input signal is less than the feedback signal to actuate said other valve means to the open condition.

41. A control system as claimed in claim 40 wherein said adjusting means includes a primary exhaust passage, and said first and second valve means controls communication between said second and first chambers, respectively, and said primary exhaust passage.

42. A control system as claimed in claim 41 wherein said adjusting means includes second and third exhaust passages each connected with said primary exhaust passage; and normally closed secondary exhaust valve means controlling said second and third exhaust passages.

43. A control system as claimed in claim 42 wherein said command signal actuates said secondary exhaust valve means to open said second exhaust passage when the magnitude of said difference is between said first and second value, and actuates said secondary exhaust valve means to open said third exhaust passage when the magnitude of said difference is greater than said second value.

44. A control system as claimed in claim 43 further including a restriction in said primary exhaust passage, said second and third exhaust passages being connected with said primary exhaust passage between said restriction and said first and second valve means, and a restriction in said second exhaust passage between the connection with said primary exhaust passage and said secondary exhaust valve means.

45. A control system as claimed in claim 44 wherein said secondary exhaust valve means comprises a medium adjustment valve controlling said second exhaust passage; and a coarse adjustment valve controlling said third exhaust passage.

46. A control system as claimed in claim 43 wherein said secondary exhaust valve means comprises a normally closed medium adjustment valve controlling said second exhaust passage, and a normally closed, coarse adjustment valve controlling said third exhaust passage.

47. A control system for controlling the speed of a shaft comprising: first and second command signal paths; a movable control member for adjusting and controlling the speed of the shaft, said control member being movable in response to a command signal over said first path to adjust the speed of the shaft in one direction and movable in response to a command signal over said second path to adjust the speed of the shaft in the opposite direction; means providing an input signal indicative of the desired speed of the shaft; means responsive to the speed of the shaft for developing a feedback signal indicative of the actual speed of the shaft; control signal means responsive to a difference between the input and feedback signals for providing first and second control signals of equal magnitude and opposite signs, the magnitude being proportional to the difference between the input and feedback signals; and selector means for transmitting a command signal over said first path when said first control signal is of one sign and has a magnitude greater than a reference value, and for transmitting a command signal over said second path when said second control signal is of said one sign and has a magnitude greater than the reference value.

48. A control system as claimed in claim 47 in which said reference value is variable such that the command signal pulsates on and off when the magnitude of the control signals is within the range of variations of the reference value.

49. A control system as claimed in claim 47 wherein said control signal means comprises a comparator for developing an error signal proportional to the difference between the input and feedback signals and amplifying and inverting means for developing said control signals in response to said error signal.

50. A control system as claimed in claim 47 wherein said selector means includes: means providing a reference signal indicative of said reference value; a first difference sensing circuit responsive to said first control signal and said reference signal for transmitting a command signal over said first path only when said first control signal is of said one sign and of greater magnitude than said reference signal; and a second difference sensing circuit responsive to said second control signal and said reference signal for transmitting a command signal over said second path only when said second control signal is of said one sign and of greater magnitude than said reference signal.

51. A control system as claimed in claim 50 wherein said control signal means comprises a comparator for developing an error signal proportional to the difference between the input and feedback signals and amplifying and inverting means for developing said control signals in response to said error signal.

52. A control system as claimed in claim 49 wherein said selector means includes: means providing a reference signal indicative of said reference value; a first difference sensing circuit responsive to said first control signal and said reference signal for transmitting a command signal over said first path only when said first control signal is of said one sign and of greater magnitude than said reference signal; and a second difference sensing circuit responsive to said second control signal and said reference signal for transmitting a command signal over said second path only when said second control signal is of said one sign and of greater magnitude than said reference signal.

53. A control system as claimed in claim 50 wherein the magnitude of said reference signal varies in a range between a minimum and maximum value such that the command signal pulsates on and off when the magnitude of the control signals is within said range.

54. A control system as claimed in claim 52 wherein the magnitude of said reference signal varies in a range between a minimum and maximum value such that the command signal pulsates on and off when the magnitude of the control signals is within said range.

55. A control system as claimed in claim 47 further including: a third command signal path; said selector means being operable to transmit a command signal over said third path as well as over one of said first and second paths when the magnitude of the control signals is greater than a second reference value having a magnitude greater than the first mentioned reference value.

56. A control system as claimed in claim 55 further including a fourth command signal path; said selector means being operable to transmit a command signal over said fourth path as well as over said third path and one of said first and second paths when the magnitude of the control signals is greater than a third reference value having a magnitude greater than said second reference value.

57. A control system for controlling the speed of an output shaft in which the speed of the shaft is determined by the position of a movable control member, said control system comprising: control member position adjusting means having a closed condition to maintain the control member stationary, and relatively slow and relatively fast adjustment conditions to respectively adjust the position of the control member at a relatively slow rate, and a relatively fast rate; means providing a variable input signal indicative of the desired speed of the output shaft; means responsive to the speed of the output shaft for developing a feedback signal indicative of the actual speed of the shaft; means for receiving said input and feedback signals and transmitting a command signal in response to a difference between said input and feedback signals to actuate said position adjusting means to the relatively slow adjustment condition when the magnitude of the difference is below a first value, and to the relatively fast adjustment condition when the magnitude of the difference is greater than said first value.

58. A control system as claimed in claim 57 further including means for modifying the command signal as the magnitude of said difference decreases in response to adjustment of the control member to cause said adjustment means to pulsate between the relatively fast and relatively slow conditions as the magnitude of said difference decreasingly approaches said first value, and pulsate between the relatively slow and closed conditions as the magnitude of the command signal approaches zero.

References Cited

UNITED STATES PATENTS

| | | |
|---|---|---|
| 2,588,742 | 3/1952 | McCallum. |
| 2,654,999 | 10/1953 | Berge _____ 60—53 |
| 3,068,796 | 12/1962 | Pfluger et al. |
| 3,365,886 | 1/1968 | Moon. |

EDGAR W. GEOGHEGAN, Primary Examiner

U.S. Cl. X.R.

91—364; 103—38